April 5, 1932.   A. F. GIESE, JR   1,852,562
CLAY GUN
Filed March 26, 1931   2 Sheets-Sheet 1
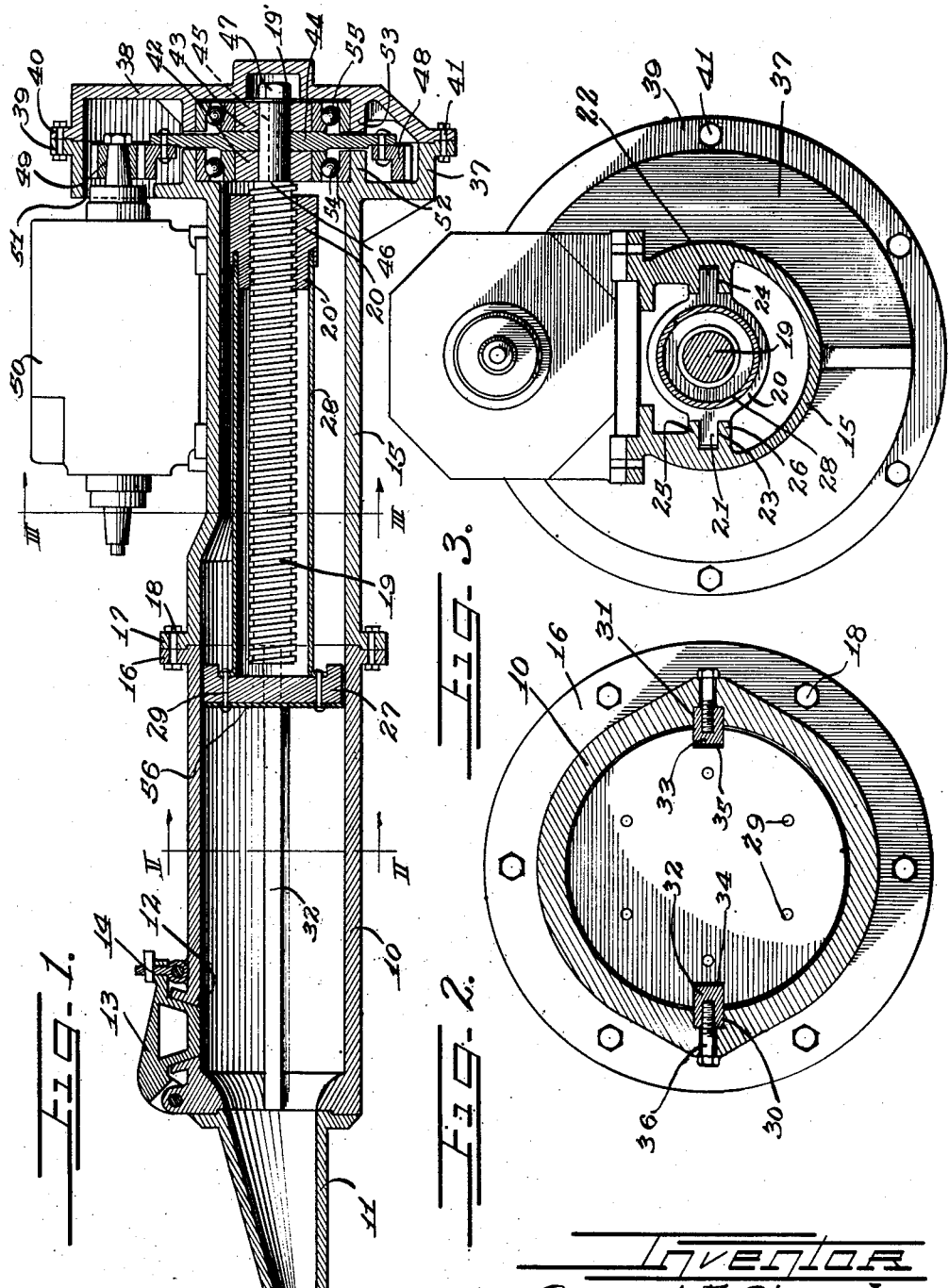

April 5, 1932.  A. F. GIESE, JR  1,852,562
CLAY GUN
Filed March 26, 1931    2 Sheets-Sheet 2
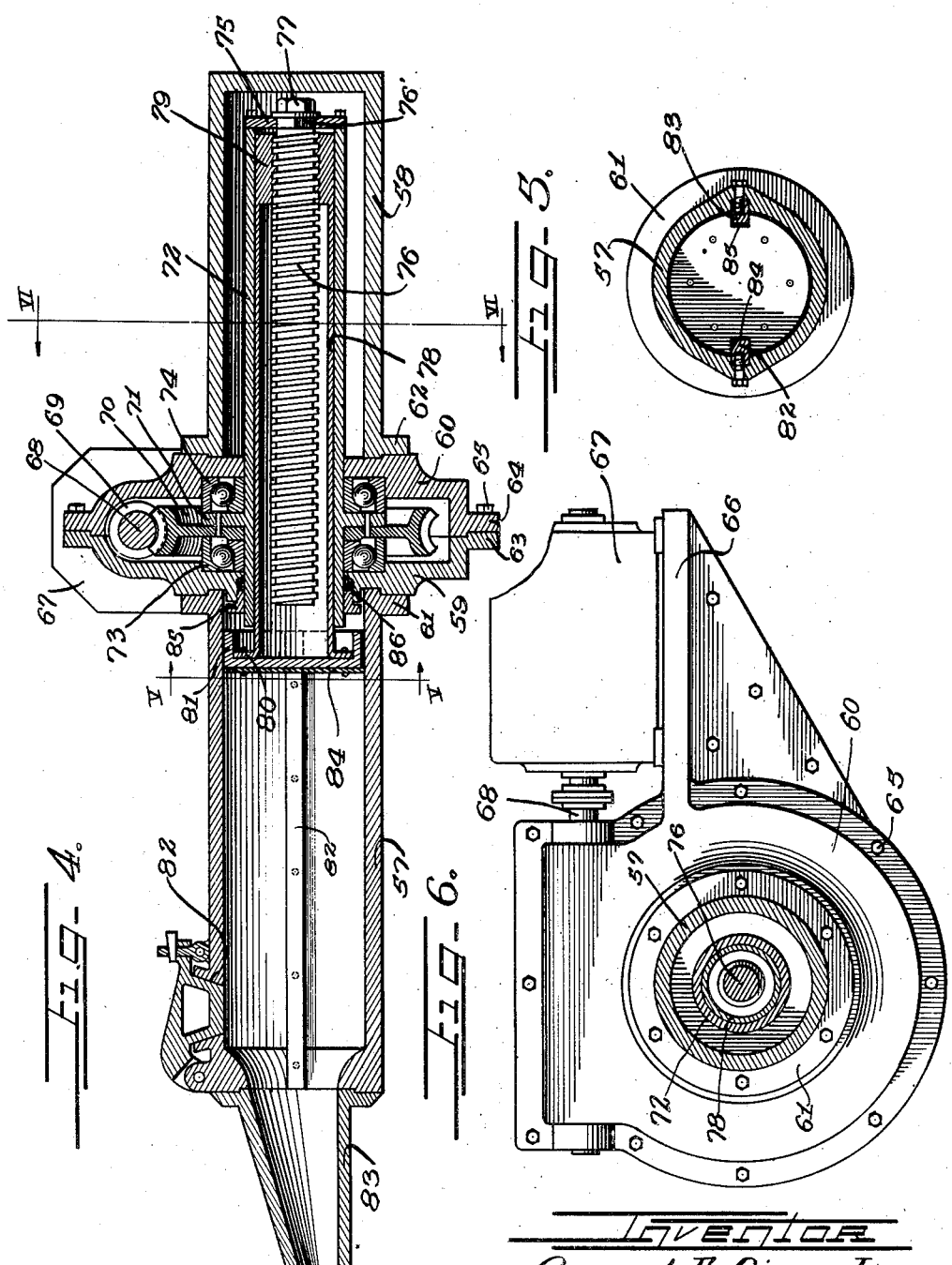
Inventor
August F. Giese, Jr.
by Charles Hill
Attys.

Patented Apr. 5, 1932

1,852,562

UNITED STATES PATENT OFFICE

AUGUST F. GIESE, JR., OF GARY, INDIANA

CLAY GUN

Application filed March 26, 1931. Serial No. 525,441.

This invention relates to mud or clay guns which are particularly applicable and useful for plugging up the tapping holes of blast furnaces to shut off the flow of molten metal and slag therefrom, the general object of the invention being to provide improved and more efficient means for powerfully moving a piston through a cylinder for the ejection of clay from the nozzle end of the cylinder.

An important object is to provide a screw shaft together with improved, simplified and more efficient means for turning the screw shaft to propel a screw nut mounted thereon and connected with the piston so that the piston will be powerfully shifted through the cylinder.

Another object is to provide improved means for preventing rotation of the propulsion nut and piston during reciprocation thereof relative to the cylinder.

Still a further object is to provide improved means for guiding the piston and for supporting the piston independently of engagement thereof with the cylinder walls in order to reduce friction and wear of the clay on the piston and cylinder walls.

A further object is to provide a compact and powerful driving train between a driving motor and the screw shaft and to form a balanced compact and efficient gun structure.

The above enumerated and other features of my invention are incorporated in the structure disclosed on the accompanying drawings, in which drawings:

Figure 1 is a vertical diametral section of the gun structure with a driving motor mounted thereon;

Figure 2 is an enlarged section on plane II—II of Figure 1;

Figure 3 is an enlarged section on plane III—III;

Figure 4 is a vertical diametral section of a gun showing a modified driving arrangement;

Figure 5 is a section on plane V—V of Figure 4; and

Figure 6 is a section on plane VI—VI of Figure 4.

The gun comprises the cylinder frame 10 to whose outer end is secured the nozzle 11, a filling hole 12 being shown near the nozzle end and provided with a closure 13 which may be hinged to the cylinder frame and provided with locking means 14 by which it may be securely locked to close the hole after a filling operation and to prevent escape of clay under the pressure of the advancing piston when the gun is discharged.

Secured to the inner end of the cylinder frame 10 and coaxial therewith is the substantially cylindrical frame 15 for housing the screw shaft and supporting the motor and the gear train between the motor and screw shaft.

Referring to Figures 1 to 3, the frames 10 and 15 are rigidly secured together by means of their flanges 16 and 17 and bolts 18. The screw shaft 19 extends axially through the frame 15 and is engaged by the screw nut 20 which, as best shown in Figure 3, has guide lugs 21 and 22 at its opposite sides which engage in guide channels 23 and 24 formed between upper and lower guide walls 25 and 26 projecting inwardly from the frame 15. These guide walls engage against the sides of the screw nut and the lugs 21 and 22 thereon and prevent movement of the screw nut except in axial direction through the frame 15.

The piston 27 which reciprocates in the cylinder 10 is rigidly secured to the inner end of a tube or sleeve 28 as by means of bolts 29, the sleeve being concentric with the screw shaft and being secured at its outer end to the screw nut 20. As shown the sleeve receives the reduced end 20′ of the screw nut to which it is rigidly secured in any suitable manner.

As best shown in Figure 2 the cylinder 10 has longitudinally extending grooves 30 and 31 in its opposite sides in which are secured guide bars 32 and 33 respectively which bars are received in the guide notches 34 and 35 in the diametrically opposite sides of the piston 27, the bars being secured by suitable means such as screws 36 extending through the cylinder walls and threading into the bars. The piston is thus restrained from rotational movement within the cylinder by the guide bars while the screw nut 20 is restrained against rotational movement by the walls 24 and 26 in the frame 15.

At its outer end of the frame 15 is enlarged to form the housing half 37 to which the outer housing half 38 may be rigidly secured in any suitable manner. As shown the housing halves have the flanges 39 and 40 respectively through which bolts 41 extend to secure the housing halves together. The reduced unthreaded end 19' of the screw shaft 19 extends into the housing structure and receives the hub members 42 and 43 and the gear body 44, these hub members and the gear body being held against rotation on the screw shaft end as by means of a key 45, and they are clamped in place on the shaft end between the shoulder 46 and a nut 47. The shaft must thus turn with the gear body 44.

The gear body has secured thereto the gear annulus 48 which is engaged by the drive pinion 49 on the shaft of the motor 50 mounted on top of the frame 15, the housing part 37 having the opening 51 through which the end of the motor extends.

The housing sections 37 and 38 have the annular flanges 52 and 53 extending inwardly therefrom but terminating short of each other to leave space for the passage of the gear body 44. These flanges serve to support the inner and outer thrust ball bearing structures 54 and 55. When the motor is operating the gear body 44 is rotated and with it the screw shaft 19 and as this shaft is held against axial movement its rotation will cause the screw nut 20 to be propelled longitudinally along the shaft and such movement of the screw nut is transmitted by the sleeve 28 to the piston 27 which will be reciprocated in the cylinder 10. During outward movement of the piston the clay which has been charged into the cylinder through the hole 12 will be projected forcibly through the nozzle 11. The high speed of the electric motor is reduced by the gears 49 and 44 and as the screw shaft is rotated its screw connection with the screw nut will cause the comparatively slow but powerful shifting of the nut and the piston connected therewith. During such shifting of the piston it and the nut will be locked against rotational movement in a manner as has already been described.

The guide bars 32 and 33 which lock the piston against rotation also guide the piston independently of any engagement thereof with the cylinder walls in order to reduce friction and prevent wear. The piston may be of slightly less diameter than the cylinder bore so as to be out of direct contact with the cylinder walls, and a washer 56 of suitable material such as asbestos is provided for the piston for preventing the escape of clay past the piston as it is forcibly shifted outwardly to discharge the clay from the cylinder. As shown this washer may be secured in place by the bolts 29 which secure the piston to the sleeve 28. If any clay should manage to get by the piston it will be prevented from reaching the screw shaft by the sleeve 28 which entirely surrounds the shaft between the piston and the screw nut.

In Figures 4, 5, and 6 is shown a modified arrangement for rotating the screw element. Secured between the cylinder 57 and the housing 58 coaxial therewith are the gearing train housings 59 and 60. The cylinder 57 has the flange 61 secured to the housing half 59 and the frame 58 has the flange 62 secured to the housing half 60, the housing halves having flanges 63 and 64 secured together as by bolts 65. The housing halves have lateral extensions forming a platform or shelf 66 for the driving motor 67 whose shaft 68 extends tangentially through the upper part of the housing halves wherein it carries the worm 69 which meshes with the worm gear 70. The web of this worm gear is secured to the flange 71 extending from the sleeve 72 which is coaxial with the cylinder 57 and frame 58. Thrust ball bearing structures 73 and 74 are interposed between the sleeve 72 and the housing halves 59 and 60 and form the bearing supports for the sleeve which rotates with the worm gear.

The sleeve 72 extends through the frame 58 which forms a housing therefor and secured to the outer end of the sleeve is a cap 75 which receives the polygonal end 76' of the screw shaft 76, a nut 77 rigidly securing the screw shaft to the cap against axial movement, the polygonal nut 76' preventing rotational movement of the screw relative to the cap. Within the sleeve 72 is the inner sleeve 78 which at its outer end is secured to the screw nut 79 and which at its inner end has the flange 80 whereby it is secured to the piston 81 within the cylinder 57. To lock the piston against rotation in the cylinder the diametrically opposite guide bars 82, 83 are provided at opposite sides of the piston to be received by the notches 84 and 85 in the piston, and these guide bars also hold the piston from frictional engagement with the cylinder walls.

When the motor is operating the worm wheel and the sleeve 72 secured thereto are rotated at reduced speed and the screw shaft 76 rotates with the sleeve 72, and, due to its threaded engagement with the nut 79, the nut is propelled longitudinally along the screw shaft and such movement is communicated through the inner sleeve 78 to the piston which is reciprocated in the cylinder 57, the guide bars 82 and 83 preventing rotation of the piston or of the screw nut. The piston will thus be comparatively slowly but very powerfully shifted in the cylinder so that clay which has been charged into the hole 82 will be ejected with great pressure through the nozzle 83. The piston may be faced by a washer 84 of asbestos or other suitable material which intimately engages the cylinder walls and tends to prevent escape of clay past the piston during the ejecting movement of the piston. A stuffing gland 85 is shown provided to compress packing material 86 between the sleeve 72 and the housing 59, such packing preventing entrance into the housing of any clay which might escape past the piston, and the packing will also prevent escape of lubricating oil from the housing to the exterior. The screw shaft 76 is at all times fully enclosed by the inner sleeve 78 so that clay cannot get to it.

I thus produce a compact, strong, well balanced, and economically manufactured gun structure for ejecting clay into the tapping holes of blast furnaces. Owing to the powerful pressure which can be exerted against the piston by the reduction gearing and screw shaft transmission, the cylinder may be made of large volume so that a sufficient amount of clay may be ejected during one operation of the gun to fully plug a tapping hole, thus making it unnecessary to only partially fill the tapping hole and then recharge the gun for final filling of the hole.

The structures shown and described are practical embodiments of the various features of my invention but it is to be understood that changes and modifications may be made without departing from the scope and spirit of the invention as defined by the appended claims.

I claim as follows:

1. In a clay gun, the combination of a cylinder adapted to receive clay to be discharged therefrom, a piston reciprocable in said cylinder, a housing structure extending from said cylinder, a screw shaft within said housing, a screw nut receiving said shaft, means connecting said screw nut and piston rigidly together, means for preventing rotation of said piston, and means for rotating said screw shaft whereby said screw nut will be shifted longitudinally along said screw shaft to cause movement of said piston longitudinally in said cylinder.

2. In a clay gun, the combination of a cylinder adapted to receive clay to be discharged therefrom, a piston reciprocable in said cylinder, a housing structure extending from said cylinder, a screw shaft extending through said housing, a screw nut receiving said screw shaft, a sleeve surrounding said screw shaft and rigidly secured to said nut and piston, means preventing rotational movement of said piston in said cylinder, and means for rotating said screw shaft to cause longitudinal movement of said nut on said shaft and movement of said piston longitudinally in said cylinder.

3. In a clay gun, the combination of a cylinder having a discharge nozzle at its one end, a piston reciprocable in said cylinder, a housing structure extending from the other end of said cylinder in axial alignment therewith, a screw shaft extending through said housing structure, a screw nut on said shaft, means rigidly connecting said screw nut with said piston so that said piston must move with said nut, means locking said piston against rotational movement in said cylinder, a driving motor supported on said housing structure, and a reduction gearing train extending from said motor and connecting with said shaft for rotating said shaft to cause longitudinal movement thereon of said nut and movement of said piston longitudinally in said cylinder.

4. In a clay gun, the combination of a cylinder having a nozzle at one end, a housing structure extending from the other end of the cylinder, a piston for reciprocating in said cylinder to eject clay therefrom, a screw shaft in the housing structure, a screw nut receiving said shaft, a frame rigidly connecting said nut with said piston, means locking said piston against rotation in said cylinder, a sleeve surrounding said nut and frame and forming a guide for the nut, said frame being secured to the end of said shaft, a driving motor supported on the housing structure, and a reduction gearing train between said motor and sleeve for causing rotation of said shaft and longitudinal movement of said nut thereon to shift said piston in the cylinder.

5. In a clay gun, the combination of a cylinder having a nozzle at one end, a housing structure secured to and extending from the other end of said cylinder, a piston reciprocable in said cylinder, a screw shaft extending through said housing structure, a screw nut receiving said shaft and rigidly connected with said piston, a driving motor mounted on said housing structure, a driving train between said motor and the end of said screw shaft, and guides on said housing structure for said screw nut for guiding said nut longitudinally of said housing structure but preventing rotational movement thereof, whereby upon operation of said motor said shaft will be turned and said nut propelled longitudinally thereon to shift the piston in the cylinder.

6. In a clay gun, the combination of a cylinder having a nozzle at one end, a housing structure extending from the other end of said cylinder, a piston reciprocable in said cylinder, a screw shaft extending through said housing, a screw nut within said housing receiving said shaft, means rigidly connecting said nut with said piston, a driving motor mounted on said housing structure, a driving train between said motor and the outer end of said shaft for rotating said shaft, guide lugs extending from said nut and said housing structure having guideways for receiving said lugs to permit movement of said lugs longitudinally of said housing structure but to restrain said nut from rotational movement, whereby when said motor is operating said screw shaft will be turned and said nut will be propelled longitudinally thereon to shift said piston in said cylinder.

7. In a clay gun, the combination of a cylinder having a nozzle at one end, a housing structure extending from the other end of the cylinder, a piston reciprocable in said cylinder, a screw shaft extending through said housing structure, a screw nut receiving said shaft, means rigidly connecting said nut with said piston, means in said housing cooperating with said nut to guide the nut for movement longitudinally of said housing structure and to prevent rotational movement thereof, guide means in said cylinder cooperating with said piston to guide said piston for movement longitudinally in said cylinder but to prevent rotational movement thereof, a driving motor mounted on said housing structure, and a driving train within said housing connecting said motor with the outer end of said shaft, whereby upon operation of said motor said shaft will be rotated and said nut shifted longitudinally thereon to cause shift of said piston in said cylinder.

8. In a clay gun, the combination of a cylinder adapted to receive clay to be discharged therefrom, a piston reciprocable in said cylinder, a housing structure extending from said cylinder, a screw shaft within said housing, a screw nut receiving said shaft, means connecting said screw nut and piston together, means for preventing rotation of said screw nut, and means for rotating said screw shaft whereby said screw nut will be shifted longitudinally along said screw shaft to cause movement of said piston in said cylinder.

In testimony whereof I have hereunto subscribed my name at Gary, Lake county, Indiana.

AUGUST F. GIESE, Jr.